(12) United States Patent
Nakatani

(10) Patent No.: US 8,829,077 B2
(45) Date of Patent: Sep. 9, 2014

(54) EASILY THERMALLY DECOMPOSABLE BINDER RESIN, BINDER RESIN COMPOSITION AND USE OF SAID COMPOSITION

(75) Inventor: Takashi Nakatani, Osaka (JP)

(73) Assignee: Arakawa Chemical Industries, Ltd., Osaka-Shi (JP)

( * ) Notice: Subject to any disclaimer, the term of this patent is extended or adjusted under 35 U.S.C. 154(b) by 127 days.

(21) Appl. No.: 13/516,106

(22) PCT Filed: Jan. 19, 2011

(86) PCT No.: PCT/JP2011/050835
§ 371 (c)(1),
(2), (4) Date: Jun. 14, 2012

(87) PCT Pub. No.: WO2011/090061
PCT Pub. Date: Jul. 28, 2011

(65) Prior Publication Data
US 2012/0296007 A1 Nov. 22, 2012

(30) Foreign Application Priority Data
Jan. 22, 2010 (JP) ................................. 2010-011541

(51) Int. Cl.
| | |
|---|---|
| *C08K 3/22* | (2006.01) |
| *C08K 3/40* | (2006.01) |
| *C08K 5/01* | (2006.01) |
| *C04B 35/632* | (2006.01) |
| *C08L 93/04* | (2006.01) |
| *C04B 35/10* | (2006.01) |
| *C09J 193/04* | (2006.01) |
| *C04B 35/46* | (2006.01) |
| *C04B 35/457* | (2006.01) |
| *C04B 35/01* | (2006.01) |
| *C04B 35/634* | (2006.01) |
| *C04B 35/638* | (2006.01) |
| *C04B 35/14* | (2006.01) |
| *C04B 35/468* | (2006.01) |
| *C04B 35/505* | (2006.01) |

(52) U.S. Cl.
CPC ......... *C04B 35/63492* (2013.01); *C04B 35/632* (2013.01); *C08L 93/04* (2013.01); *C04B 35/10* (2013.01); *C09J 193/04* (2013.01); *C04B 2235/3286* (2013.01); *C04B 35/46* (2013.01); *C04B 35/457* (2013.01); *C04B 35/01* (2013.01); *C04B 35/638* (2013.01); *C04B 2235/3293* (2013.01); *C04B 35/14* (2013.01); *C04B 35/4682* (2013.01); *C04B 35/505* (2013.01)
USPC ............ 523/125; 524/413; 524/431; 524/494

(58) Field of Classification Search
CPC .............. C08K 3/22; C08K 3/40; C08K 5/01; C04B 35/63492; C04B 35/10; C04B 35/638; C04B 35/457; C04B 35/4682; C04B 35/14; C04B 35/505; C04B 35/632; C04B 35/01; C04B 35/46; C04B 2235/3286; C04B 2235/3293; C08L 93/04; C09J 193/04
USPC .......................... 523/125; 524/413, 431, 494
See application file for complete search history.

(56) References Cited

U.S. PATENT DOCUMENTS 3,320,695 A * 5/1967 Moore, Jr. ........................... 47/9

FOREIGN PATENT DOCUMENTS

| JP | 58-20775 A | 2/1983 |
|---|---|---|
| JP | 61-261250 A | 11/1986 |
| JP | 3-250701 A | 11/1991 |
| JP | 4-74760 A | 3/1992 |
| JP | 10-77596 A | 3/1998 |
| JP | 2732479 B2 | 3/1998 |
| JP | 2000-231990 A | 8/2000 |
| JP | 2008-30105 A | 2/2008 |
| JP | 2008-270027 A | 11/2008 |
| JP | 2009-70727 A | 4/2009 |

OTHER PUBLICATIONS

International Search Report, dated Feb. 22, 2011, issued in PCT/JP2011/050835.

* cited by examiner

Primary Examiner — Kriellion Sanders
(74) Attorney, Agent, or Firm — Birch, Stewart, Kolasch & Birch, LLP

(57) ABSTRACT

A thermally decomposable binder resin containing, as an active ingredient, a rosin derivative (A) that is obtained by subjecting a rosin (a) to distillation and a disproportionation treatment and/or hydrogenation treatment, wherein the rosin derivative (A) has a 99 wt % weight loss temperature of 500° C. or lower in thermogravimetric measurement, under an air atmosphere at a heating rate of 5° C./min, a binder resin composition containing the resin, and a use of the binder resin composition.

10 Claims, No Drawings

EASILY THERMALLY DECOMPOSABLE BINDER RESIN, BINDER RESIN COMPOSITION AND USE OF SAID COMPOSITION

TECHNICAL FIELD

The present invention relates to an easily thermally decomposable binder resin, a binder resin composition containing the resin, and a use of the binder resin composition.

BACKGROUND ART

As a method for producing a molded article of inorganic solid powder such as metal powder or ceramic powder, a method is known in which inorganic solid powder is dispersed in a thermoplastic binder and a lubricant to form a composition for molded article production, then the composition is subjected to preliminary molding by injection molding, and the resulting pre-molded article is heated to decompose and volatilize the components other than the inorganic solid powder present in the molded article in order to be degreased and is calcined to give a molded article that is a sintered body.

Stearic acid, which has been used heretofore as the aforementioned lubricant, decomposes at relatively low temperatures, and is thus problematic in that it decomposes while being kneaded with inorganic solid powder and a thermoplastic binder and results in poor kneading. Accordingly, a method that uses behenic acid, which has a higher decomposition temperature, has been proposed (see patent literature 1).

Although problems such as poor kneading can be solved by the method of patent literature 1, since behenic acid has a structure having a long chain alkyl group, its compatibility with a thermoplastic binder may be insufficient depending on the kind of the thermoplastic binder.

Also, a method is known in which a metal nanoparticle-containing dispersion is applied to a substrate so as to form a pattern, and calcined at a temperature as low as, for example, 300° C. or lower to form a conductive layer having a fine pattern composed of a sintered body layer in which the particles are aggregated to each other (see patent literature 2). Patent literature 2 states that a rosin derivative, which serves as a supply source of hydrogen atoms, is introduced to the metal nanoparticle-containing dispersion to remove the oxide layer on the metal nanoparticle surface, thus giving a dense sintered body. However, the method of patent literature 2 involves low-temperature calcination, and thus the rosin derivative in the dispersion does not thermally decompose sufficiently and remains as an impurity in the sintered body. Therefore, the method is problematic in, for example, resulting in conduction failure and a poor appearance.

CITATION LIST

Patent Literature

Patent Literature 1: Japanese Patent No. 2732479
Patent Literature 2: JP 2009-70727A

SUMMARY OF INVENTION

Technical Problem

An object of the present invention is to provide an easily thermally decomposable binder resin that has excellent thermal decomposability and can be suitably used as a binder for an inorganic solid powder molded article in place of a thermoplastic binder and a lubricant; a binder resin composition containing the resin; and a use of the binder resin composition.

Solution to Problem

As a result of having conducted extensive research to achieve the aforementioned object, the present inventors found that a specific rosin derivative has excellent thermal decomposability and can be suitably used as a binder for an inorganic solid powder molded article in place of a thermoplastic binder and a lubricant. Based on such findings, the inventors conducted further research and accomplished the present invention.

The present invention provides an easily thermally decomposable binder resin, a binder resin composition containing the resin, and a use of the binder resin composition as follows.

Item 1. An easily thermally decomposable binder resin comprising, as an active ingredient, a rosin derivative (A) that is obtained by subjecting a rosin (a) to distillation and a disproportionation treatment and/or hydrogenation treatment and that has a 99 wt % weight loss temperature in thermogravimetric measurement under an air atmosphere at a heating rate of 5° C./min of 500° C. or lower.

Item 2. The binder resin according to item 1, wherein the rosin derivative (A) has a proportion of a component having a molecular weight in terms of polystyrene by GPC of 600 or greater of 1.5 wt % or less, and an absorbance at 300 nm by ultraviolet absorptiometry (measurement conditions: a sample concentration of 1 g/dm$^3$ and a cell length of 1 cm) of 0.3 or less.

Item 3. The binder resin according to item 1, leaving no residual soil after being thermally treated at from 25° C. to 500° C. at a rate of increase of 5° C. per minute under a nitrogen atmosphere.

Item 4. A binder resin composition comprising the easily thermally decomposable binder resin of item 1.

Item 5. The binder resin composition according to item 4, further comprising an organic solvent.

Item 6. The binder resin composition according to item 4, being a binder for powder metallurgy.

Item 7. The binder resin composition according to item 4, being a binder for ceramic calcination.

Item 8. The binder resin composition according to item 7, wherein ceramic is indium tin oxide.

Item 9. The binder resin composition according to item 4, being a binder for glass calcination.

Advantageous Effects of Invention

According to the present invention, the following remarkable effects are obtained.

(1) The easily thermally decomposable binder resin of the present invention has excellent thermal decomposability and can be suitably used as a binder resin for an inorganic solid powder molded article in place of conventional thermoplastic binders and lubricants.

That is, the easily thermally decomposable binder resin of the present invention is suitable as-is, or in the form of a composition containing the resin, as a thermally decomposable binder for injection molding, cast molding, and the like in the case where a molded article of inorganic solid powder such as metal powder, ceramic powder, or glass powder is produced. In particular, as a binder for ceramic powder molding, the binder resin of the present invention is most suitable when it is used as a binder for indium tin oxide powder molding.

(2) Since the easily thermally decomposable binder resin of the present invention has good compatibility with various polymers, the binder resin can also be used together with, if necessary, other thermally decomposable polymers.

(3) Moreover, in the case where a metal nanoparticle-containing dispersion is applied to a substrate so as to form a pattern, and sintered at a low temperature to form a conductive layer having a fine pattern composed of a sintered body in which the particles are aggregated to each other, a dispersion that contains metal nanoparticles and the easily thermally decomposable binder resin of the present invention can be used as the foregoing dispersion.

DESCRIPTION OF EMBODIMENTS

Easily Thermally Decomposable Binder Resin

The easily thermally decomposable binder resin of the present invention contains a rosin derivative (A) as its active ingredient. The binder resin is suitably used as-is, or in the form of a composition containing the resin, as a thermally decomposable binder for injection molding, cast molding, or the like in the case where a molded article of inorganic solid powder is produced; or as a thermally decomposable binder for conductive pattern formation; and the like.

The rosin derivative (A) can be prepared by subjecting a rosin (a) to distillation and a disproportionation treatment and/or hydrogenation treatment. The resulting rosin derivative (A) is characterized in that its excellent thermal decomposability, or that is, the 99 wt % weight loss temperature is 500° C. or lower in thermogravimetric measurement under an air atmosphere at a heating rate of 5° C./min.

As the raw material rosin (a), natural rosins such as wood rosin, tall oil rosin, and gum rosin, and like rosins can be used. The rosin (a) is a mixture of a resin acid including abietic acid, palustric acid, levopimaric acid, or the like. As the rosin (a), commercially available hydrogenated products of the aforementioned natural rosins can also be used. In the case of such a hydrogenated product also, the same treatment as that for the natural rosins usually needs to be performed to impart the aforementioned excellent thermal decomposability.

It is usually sufficient that distillation is performed at a temperature in the range of about 200 to about 300° C. under a pressure in the range of about 130 to about 1300 Pa.

For the disproportionation treatment, known rosin disproportionation conditions can be employed. Specifically, for example, heating in the range of about 100 to about 300° C. may be performed in the presence of a disproportionation catalyst using an organic solvent as necessary. The reaction pressure is preferably less than 1 MPa or may be atmospheric. The disproportionation catalyst is not particularly limited and known disproportionation catalysts can be used. It is preferable to use a palladium catalyst, a platinum catalyst, or the like Examples of palladium catalysts include palladium carbon, palladium alumina, palladium silica, palladium silica alumina, zeolite-supported palladium, and the like. Examples of platinum catalysts include platinum carbon, platinum silica, platinum silica alumina, zeolite-supported platinum, and the like.

For the hydrogenation treatment, known rosin hydrogenation conditions can be employed. Specifically, for example, the rosin (a) is heated to about 100 to about 300° C. at about 2 to about 20 MPa in the presence of a hydrogenation catalyst under a hydrogen atmosphere using an organic solvent as necessary. The reaction pressure is preferably about 5 to about 20 MPa. The reaction temperature is preferably about 150 to about 290° C. As the hydrogenation catalyst, a variety of known hydrogenation catalysts such as supported catalysts, metal powder, iodine, and iodides can be used. Examples of supported catalysts include palladium carbon, rhodium carbon, ruthenium carbon, platinum carbon, and the like. Examples of metal powder include nickel powder, platinum powder, and the like. Examples of iodides include iron iodide and the like. Among such examples, a catalyst that contains palladium, rhodium, ruthenium, or platinum enhances the extent of hydrogenation of the rosin and shortens the hydrogenation time, thus being preferable. The amount of hydrogenation catalyst used is usually about 0.01 to about 5 parts by weight and preferably about 0.01 to about 2 parts by weight relative to 100 parts by weight of the rosin (a).

The rosin derivative (A) may be those obtained by subjecting the rosin (a) to distillation and a disproportionation treatment or to distillation and a hydrogenation treatment. Also, the rosin derivative (A) may be those obtained by subjecting the rosin (a) to all of the distillation, disproportionation treatment, and hydrogenation treatment. The order of performing the respective treatments is not particularly limited. It is preferable, particularly from the view point of reducing coloring and enhancing thermal decomposability, to carry out in an order of disproportionation, distillation, and hydrogenation.

It is necessary that the rosin derivative (A) thus obtained has a 99 wt % weight loss temperature in thermogravimetric measurement under an air atmosphere at a heating rate of 5° C./min of 500° C. or lower. Moreover, it is preferable that the softening point is about 75 to about 95° C. and the acid value is about 160 to about 190 mg KOH/g. The softening point is a value measured by a ring and ball method according to JIS K 5902, and the acid value is a value measured according to JIS K 2501.

It is preferable that the rosin derivative (A) has a proportion of a component having a molecular weight in terms of polystyrene by GPC of 600 or greater of 1.5 wt % or less, and an absorbance at 300 nm by ultraviolet absorptiometry (measurement conditions: a sample concentration of 1 g/dm$^3$ and a cell length of 1 cm) of 0.3 or less.

The rosin derivative (A) is a mixture of components having various molecular weights and also contains a component having a molecular weight of 600 or greater. A component having a molecular weight of 600 or greater is less volatile than diterpenes such as abietic acid, palustric acid, and levopimaric acid, which are principal components of rosin. When contained in an amount exceeding 1.5 wt %, such a component is likely to increase the 99 wt % weight loss temperature in thermogravimetric measurement at a heating rate of 5° C./min. When a compound having a conjugated double bond is not sufficiently lessened in the rosin derivative (A), the absorbance at 300 nm is increased. When the aforementioned absorbance at 300 nm exceeds 0.3, a reaction such as polymerization during heating occurs, and the 99 wt % weight loss temperature in thermogravimetric measurement at a heating rate of 5° C./min tends to be increased.

Since the rosin derivative (A) has excellent thermal decomposability, the rosin derivative (A) preferably does not leave any residual soil after being thermally treated at from 25° C. to 500° C. at a rate of increase of 5° C. per minute under a nitrogen atmosphere.

Binder Resin Composition

The binder resin composition of the present invention is an easily thermally decomposable composition containing the easily thermally decomposable binder resin of the present invention. The binder resin composition of the present invention can contain an organic solvent in addition to the easily thermally decomposable binder resin. Also, a thermally decomposable polymer and other additives can be contained as necessary.

Regarding the organic solvent that can be contained in the binder resin composition of the present invention, the organic solvent used in the disproportionation treatment and/or the hydrogenation treatment during the preparation of the rosin derivative (A) may be contained as-is, or another organic solvent may be blended as necessary. The organic solvent is not particularly limited, and specific examples include ethyl alcohol, isopropyl alcohol, n-propyl alcohol, and like alcohol solvents; methoxyalcohol, ethoxyalcohol, and like cellosolve solvents; methoxyethoxyethanol, diethoxyethanol, butoxyethoxyethanol, and like carbitol solvents; ethyl acetate, butyl acetate, methyl methoxypropionate, ethyl lactate, and like ester solvents; methoxyethyl acetate, ethoxyethyl acetate, ethyl cellosolve acetate, and like cellosolve acetate solvents; methoxyethoxyethyl acetate, diethoxyethyl acetate, and like carbitol acetate solvents; ethylene glycol dimethyl ether, diethylene glycol dimethyl ether, tetrahydrofuran, and like ether solvents; N,N-dimethylformamide, N,N-dimethylacetamide, N-methyl-2-pyrrolidone, and like aprotic amide solvents; γ-butyrolactone and like lactone solvents; toluene, xylene, and like aromatic hydrocarbon solvents; n-heptane, n-hexane, n-octane, and like aliphatic hydrocarbon solvents; and like organic solvents. In the case where the organic solvent is contained, the amount thereof is not particularly limited, and it is usually preferable that the amount is in the range of about 10 to about 2000 parts by weight per 100 parts by weight of the rosin derivative (A).

Examples of the thermally decomposable polymer that can be contained in the binder resin composition of the present invention include acrylic resin, a cellulose derivative, poly-α-methylstyrene, a styrene-α-methylstyrene copolymer, polyvinyl acetate, polyvinyl butyral, polyvinyl alcohol, and the like. Among such examples, use of a thermally decomposable polymer having a 99 wt % weight loss temperature in thermogravimetric measurement at a heating rate of 5° C./min of 500° C. or lower is preferable because it makes the thermal decomposability of the composition favorable. The amount of the thermally decomposable polymer contained is not particularly limited.

Binder for Powder Metallurgy

The binder for powder metallurgy of the present invention is a thermally decomposable binder for injection molding, cast molding, or the like in the case of producing a molded article of metal powder. As the binder for powder metallurgy, the binder resin composition of the present invention may be used as-is, or may be used after being blended with a known additive as long as thermal decomposability and other properties are not adversely affected. Lubricants, dispersants, and the like can be used as additives. Examples of lubricants include wax and the like. Examples of usable dispersants include various surfactants, polymer dispersants such as polycarboxylic acids, and the like. Such additives can be blended singly or as a combination of two or more. Metal powder is not particularly limited, and examples include powders of metals such as iron, copper, titanium, aluminium, tungsten, molybdenum, nickel, and chromium; powders of various alloys of such metals; and the like.

Binder for Ceramic Calcination

The binder for ceramic calcination of the present invention is a thermally decomposable binder for injection molding, cast molding, or the like in the case of producing a molded article of ceramic powder. As the binder for ceramic calcination, the binder resin composition of the present invention may be used as-is, or may be used after being blended with a known additive as long as thermal decomposability and other properties are not adversely affected. Examples of additives include crystal growth inhibitors, dispersants, plasticizers, and the like. Examples of crystal growth inhibitors include oxides such as MgO and $SiO_2$; amino alcohols; and the like. Examples of usable dispersants include various surfactants, polymer dispersants such as polycarboxylic acids, and the like. Known plasticizers can be used as such plasticizers, and those having a boiling point of 200° C. or higher are preferable. Specific examples of plasticizers include phthalic acid compounds, adipic acid compounds, sebacic acid compounds, azelaic acid compounds, phosphoric acid compounds, fatty acid compounds, epoxy compounds, trimellitic acid compounds, butyl oleate, chlorinated paraffin, polybutene, polyisobutylene, and the like. Such additives can be blended singly or as a combination of two or more. Ceramic powder is not particularly limited, and examples include powders of various ceramics such as barium titanate, indium oxide, indium tin oxide, titanium oxide, aluminum oxide, barium oxide, lead oxide, zirconium oxide, silicon oxide, and yttrium oxide. Those that change to ceramics such as indium tin oxide by calcination are also encompassed.

Binder for Glass Calcination

The binder for glass calcination of the present invention is a thermally decomposable binder for injection molding, cast molding, or the like in the case of producing a molded article of glass powder. As the binder for glass calcination, the binder resin composition of the present invention may be used as-is, or may be used after being blended with a known additive as long as thermal decomposability and other properties are not adversely affected. Examples of additives include dispersants, plasticizers, stabilizers, surface tension regulators, and the like. Examples of usable dispersants include various surfactants, polymer dispersants such as polycarboxylic acids, and the like. Known plasticizers can be used as such plasticizers, and those having a boiling point of 200° C. or higher are preferable. Specific examples of plasticizers include phthalic acid compounds, adipic acid compounds, sebacic acid compounds, azelaic acid compounds, phosphoric acid compounds, fatty acid compounds, epoxy compounds, trimellitic acid compounds, butyl oleate, chlorinated paraffin, polybutene, polyisobutylene, and the like. Such additives can be blended singly or as a combination of two or more. Glass powder is not particularly limited, and examples include various glass powders such as $PbO$—$B_2O_3$—$SiO_2$ low-melting glass powder.

EXAMPLES

The present invention shall be described in more detail below by way of production examples, examples, and comparative examples, but the scope of the present invention is not limited to the examples. In the examples, "%" is based on the weight. Also, in the examples, the absorbance of a rosin derivative and the proportion of a component having a molecular weight of 600 or greater were measured according to the following methods.

Absorbance 25.0 mg of a test rosin derivative was precisely weighed and placed in a 25 ml volumetric flask and dissolved in cyclohexane, and then the volume was increased so as to reach the 25 ml graduation. The absorbance at 300 nm was read with a UV spectrophotometer (HITACHI u-3210 spectrophotometer) using a quartz cell having a cell length of 1 cm.

Proportion of Component Having Molecular Weight of 600 or Greater

Regarding the test rosin derivative, the proportion of a component having a molecular weight of 600 or greater was calculated using the value obtained in terms of polystyrene from the calibration curve of standard polystyrene by gel permeation chromatography (GPC). Measurement conditions of GPC are as follows.

Analyzer: HLC-8220 (manufactured by Tosoh Corporation)
Columns: TSK-GEL G1000HXL, TSK-GEL G2000HXL
Eluant: Tetrahydrofuran
Concentration of sample introduced: 5 mg/mL
Flow rate: 0.6 mL/min
Amount introduced: 100 μL
Column temperature: 40° C.
Detector: RI Production Example 1

600 g of gum rosin produced in China and 1.8 g of 5% palladium carbon (a water content of 50%) as a catalyst were placed in a 1 L flask, the temperature was increased to 275° C., and a disproportionation reaction was carried out for 3 hours. The catalyst was filtered off, and distillation was carried out under a reduced pressure of 400 Pa. The component distilled off at 195 to 250° C. was regarded as a rosin derivative (i). The absorbance at 300 nm was 0.18, and the content of a component having a molecular weight of 600 or greater was 0.2%.

Production Example 2

600 g of a hydrogenated product of gum rosin produced in China was placed in a 1 L flask, distilled under the same conditions as in Production Example 1, and the component distilled off at 195 to 250° C. was obtained. 400 g of this component distilled off at 195 to 250° C. and 1.2 g of 5% palladium carbon (a water content of 50%) were placed in a 1 L flask, and a disproportionation reaction was carried out for 3 hours. The catalyst was filtered off, and a rosin derivative (ii) was obtained. The absorbance at 300 nm was 0.15, and the content of a component having a molecular weight of 600 or greater was 0.3%.

Production Example 3

600 g of a hydrogenated product of gum rosin produced in China was placed in a 1 L flask, distilled under the same conditions as in Production Example 1, and the component distilled off at 195 to 250° C. was obtained. 200 g of the component distilled off at 195 to 250° C., 3.0 g of 5% palladium alumina, and 200 g of cyclohexane were placed in a 1 L autoclave. After sufficient hydrogen gas substitution inside the system, the hydrogen pressure at the initial stage of the reaction was adjusted so as to be 6 MPa, and the temperature was increased to 200° C. Then, the hydrogen pressure was adjusted so as to be 10 MPa, and a hydrogenation reaction was carried out for 4 hours while suitably replenishing hydrogen according to the pressure decrease. The catalyst was filtered off, the cyclohexane was distilled off under reduced pressure, and a rosin derivative (iii) was obtained. The absorbance at 300 nm was 0.01, and the content of a component having a molecular weight of 600 or greater was 0.3%.

Production Example 4

A hydrogenated product of gum rosin produced in China was distilled under the same conditions as in Production Example 1, and the component distilled off at 195 to 250° C. was regarded as a rosin derivative (iv). The absorbance at 300 nm was 0.07, and the content of a component having a molecular weight of 600 or greater was 1.4%.

Production Example 5

Gum rosin produced in China was distilled under the same conditions as in Production Example 1, and the component distilled off at 195 to 250° C. was regarded as a rosin derivative (v). The absorbance at 300 nm was 1.6, and the content of a component having a molecular weight of 600 or greater was 1.4%.

Examples 1 to 4

The 99% weight loss temperatures of the rosin derivatives (i) to (iv) obtained in Production Examples 1 to 4 were measured under an air atmosphere at a heating rate of 5° C./min using a thermogravimetric/differential thermal analyzer (trade name "TG/DTA220", manufactured by Seiko Instruments Inc.) and were all 500° C. or lower, and thus the rosin derivatives were found to correspond to the rosin derivative (A) of the present invention.

Comparative Examples 1 to 4

The 99% weight loss temperatures of the rosin derivative (v) obtained in Production Example 5, a rosin derivative (vi), which is gum rosin produced in China (the absorbance at 300 nm was 1.6, and the content of a component having a molecular weight of 600 or greater was 3.0%), a rosin derivative (vii), which is a hydrogenation product of gum rosin produced in China (the absorbance at 300 nm was 0.07, and the content of a component having a molecular weight of 600 or greater was 2.0%), and a rosin derivative (viii), which is disproportionated rosin produced in China (the absorbance at 300 nm was 0.17, and the content of a component having a molecular weight of 600 or greater was 4.9%), were measured under an air atmosphere at a heating rate of 5° C./min and all exceeded 500° C., and it was thus found that those rosin derivatives do not correspond to the rosin derivative (A) of the present invention.

Thermal Decomposition Test Under Nitrogen Stream

Measurement of the 99% weight loss temperature in thermogravimetric measurement under a nitrogen atmosphere at a heating rate of 5° C./min was carried out as follows. That is, the 99% weight loss temperatures of the rosin derivatives (i) to (viii) were measured under a nitrogen atmosphere at a heating rate of 5° C./min using a thermogravimetric/differential thermal analyzer (trade name "TG/DTA220", manufactured by Seiko Instruments Inc.). Moreover, the state of a residue after testing was evaluated using the following criteria.

1: Absolutely no residue was observed visually

2: A small amount of residue was observed, but the appearance was good

3: A black or brown residue remained and the appearance was poor

Table 1 shows the 99% weight loss temperatures of Examples 1 to 4 [rosin derivatives (i) to (iv)] and Comparative Examples 1 to 4 [rosin derivatives (v) to (viii)], and the states of residues after a thermal treatment under a nitrogen stream.

TABLE 1

|  | Rosin derivative | 99% Weight loss temperature (° C.) | Residue after thermal treatment under nitrogen stream |
|---|---|---|---|
| Ex. 1 | Rosin derivative (i) | 462 | 1 |
| Ex. 2 | Rosin derivative (ii) | 412 | 1 |
| Ex. 3 | Rosin derivative (iii) | 370 | 1 |
| Ex. 4 | Rosin derivative (iv) | 471 | 2 |
| Comp. Ex. 1 | Rosin derivative (v) | >550 | 3 |
| Comp. Ex. 2 | Rosin derivative (vi) | >550 | 3 |
| Comp. Ex. 3 | Rosin derivative (vii) | 502 | 3 |
| Comp. Ex. 4 | Rosin derivative (viii) | 505 | 3 |

Example 5

To 50 g of a 20% toluene solution of the rosin derivative (i), which is the rosin derivative (A), was added 100 g of aluminum alloy powder having an average particle diameter of 100 μm (Al: 86%, Si: 10%, Fe: 1%, Cu: 2%, $M_g$: 1%) and mixed using a ball mill disperser, and a binder resin composition for powder metallurgy in a paste form was thus obtained. This binder resin composition was applied to a glass substrate by screen printing so as to have a thickness of 30 μm, and calcined under a nitrogen atmosphere at 450° C. for 10 minutes for sintering. No black residue was observed on the sintered body.

Examples 6 to 8

Sintered bodies were obtained by calcination in the same manner as in Example 5 except that the rosin derivative (A) was replaced by those presented in Table 2.

Example 9

100 g of barium titanate powder having an average particle diameter of 0.5 μm, 10 g of the rosin derivative (i), 40 g of methyl ethyl ketone, and 30 g of toluene were mixed using a ball mill disperser, and a binder resin composition for ceramic calcination was thus obtained. This binder resin composition was applied to a glass substrate by screen printing so as to have a thickness of 20 μm, and calcined under a reducing atmosphere composed of $N_2$, $H_2$, and $H_2O$ at 450° C. for 2 hours for sintering. No black residue was observed on the sintered body.

Examples 10 to 12

Sintered bodies were obtained by calcination in the same manner as in Example 9 except that the rosin derivative (A) was replaced by those presented in Table 2.

Example 13

60 g of PbO—$B_2O_3$—$SiO_2$ low-melting glass powder, 10 g of the rosin derivative (i), and 20 g of butyl carbitol acetate were sufficiently kneaded using a roll mill disperser, and a binder resin composition for glass calcination was thus obtained. This binder resin composition was applied to a glass substrate by screen printing so as to have a thickness of 200 μm and calcined under a nitrogen atmosphere at 580° C. for 30 minutes, and a sintered body was thus obtained. No black residue was observed on the sintered body.

Examples 14 to 16

Sintered bodies were obtained by calcination in the same manner as in Example 13 except that the rosin derivative (A) was replaced by those presented in Table 2.

Example 17

40 g of indium oxide powder, 4.4 g of tin oxide powder, 5 g of the rosin derivative (i), and 20 g of butyl carbitol acetate were mixed using a ball mill disperser, and a binder resin composition for ceramic calcination was thus obtained. This binder resin composition was applied to a glass substrate by screen printing so as to have a thickness of 10 μm and calcined under an air atmosphere at 580° C. for 30 minutes, and a sintered body was thus obtained. No black residue was observed on the sintered body.

Examples 18 to 20

Sintered bodies were obtained by calcination in the same manner as in Example 17 except that the rosin derivative (A) was replaced by those presented in Table 2.

Example 21

40 g of acetylacetone indium, 0.1 g of acetylacetone tin, 42 g of p-tert-butylphenol, 14 g of di-2-ethylhexyl succinate, and 10 g of the rosin derivative (i) were mixed in a flask, heated to 130° C., and stirred for 2 hours. The mixture was cooled, and a binder resin composition for ceramic calcination was thus obtained. This binder resin composition was applied to a glass substrate using an applicator so as to have a thickness of 2 μm and calcined under an air atmosphere at 500° C. for 1 hour, and a sintered body was thus obtained. No black residue was observed on the sintered body.

Examples 22 to 24

Sintered bodies were obtained by calcination in the same manner as in Example 21 except that the rosin derivative (A) was replaced by those presented in Table 2.

Evaluation of Residues Derived from Rosin Derivatives after Calcination

The state of residues derived from the rosin derivatives after calcination of Examples 5 to 24 was visually evaluated using the following criteria.

1: Absolutely no residue was observed
2: A small amount of residue was observed, but the appearance was good
3: A black or brown residue remained and the appearance was poor Results of evaluation of the residues derived from the rosin derivatives after calcination are shown in Table 2.

TABLE 2

|  | Rosin derivative (A) | Residue derived from rosin derivative |
|---|---|---|
| Ex. 5 | Rosin derivative (i) | 1 |
| Ex. 6 | Rosin derivative (ii) | 1 |
| Ex. 7 | Rosin derivative (iii) | 1 |
| Ex. 8 | Rosin derivative (iv) | 1 |
| Ex. 9 | Rosin derivative (i) | 1 |
| Ex. 10 | Rosin derivative (ii) | 1 |
| Ex. 11 | Rosin derivative (iii) | 1 |
| Ex. 12 | Rosin derivative (iv) | 1 |
| Ex. 13 | Rosin derivative (i) | 1 |
| Ex. 14 | Rosin derivative (ii) | 1 |

TABLE 2-continued

| | Rosin derivative (A) | Residue derived from rosin derivative |
|---|---|---|
| Ex. 15 | Rosin derivative (iii) | 1 |
| Ex. 16 | Rosin derivative (iv) | 1 |
| Ex. 17 | Rosin derivative (i) | 2 |
| Ex. 18 | Rosin derivative (ii) | 2 |
| Ex. 19 | Rosin derivative (iii) | 1 |
| Ex. 20 | Rosin derivative (iv) | 2 |
| Ex. 21 | Rosin derivative (i) | 2 |
| Ex. 22 | Rosin derivative (ii) | 2 |
| Ex. 23 | Rosin derivative (iii) | 1 |
| Ex. 24 | Rosin derivative (iv) | 2 |

Comparative Examples 5 to 8

Sintered bodies were obtained by calcination in the same manner as in Example 5 except that the rosin derivative used was replaced by those presented in Table 3.

Comparative Examples 9 to 12

Sintered bodies were obtained by calcination in the same manner as in Example 9 except that the rosin derivative used was replaced by those presented in Table 3.

Comparative Examples 13 to 16

Sintered bodies were obtained by calcination in the same manner as in Example 13 except that the rosin derivative used was replaced by those presented in Table 3.

Comparative Examples 17 to 20

Sintered bodies were obtained by calcination in the same manner as in Example 17 except that the rosin derivative used was replaced by those presented in Table 3.

Comparative Examples 21 to 24

Sintered bodies were obtained by calcination in the same manner as in Example 21 except that the rosin derivative used was replaced by those presented in Table 3.

In regard to Comparative Examples 5 to 24, results of evaluation of the residues derived from the rosin derivatives after calcination, which was carried out in the same manner as above, are shown in Table 3.

TABLE 3

| | Rosin derivative | Residue derived from rosin derivative |
|---|---|---|
| Comp. Ex. 5 | Rosin derivative (v) | 3 |
| Comp. Ex. 6 | Rosin derivative (vi) | 3 |
| Comp. Ex. 7 | Rosin derivative (vii) | 3 |
| Comp. Ex. 8 | Rosin derivative (viii) | 3 |
| Comp. Ex. 9 | Rosin derivative (v) | 3 |
| Comp. Ex. 10 | Rosin derivative (vi) | 3 |
| Comp. Ex. 11 | Rosin derivative (vii) | 3 |
| Comp. Ex. 12 | Rosin derivative (viii) | 3 |
| Comp. Ex. 13 | Rosin derivative (v) | 3 |
| Comp. Ex. 14 | Rosin derivative (vi) | 3 |
| Comp. Ex. 15 | Rosin derivative (vii) | 3 |
| Comp. Ex. 16 | Rosin derivative (viii) | 3 |
| Comp. Ex. 17 | Rosin derivative (v) | 3 |
| Comp. Ex. 18 | Rosin derivative (vi) | 3 |
| Comp. Ex. 19 | Rosin derivative (vii) | 3 |
| Comp. Ex. 20 | Rosin derivative (viii) | 3 |
| Comp. Ex. 21 | Rosin derivative (v) | 3 |
| Comp. Ex. 22 | Rosin derivative (vi) | 3 |
| Comp. Ex. 23 | Rosin derivative (vii) | 3 |
| Comp. Ex. 24 | Rosin derivative (viii) | 3 |

INDUSTRIAL APPLICABILITY

The easily thermally decomposable binder resin of the present invention is suitably used as-is, or in the form of a composition containing the resin, as a thermally decomposable binder for injection molding, cast molding, or the like in the case where a molded article of inorganic solid powder is produced; or as a thermally decomposable binder for conductive pattern formation; and the like.

The invention claimed is:

1. A thermally decomposable binder resin comprising, as an active ingredient, a rosin derivative (A) that is obtained by subjecting a rosin (a) to distillation and a disproportionation treatment and/or hydrogenation treatment, said rosin derivative (A) having a 99 wt % weight loss temperature of 500° C. or lower in thermogravimetric measurement under an air atmosphere at a heating rate of 5° C./min.

2. The binder resin according to claim 1, wherein the rosin derivative (A) has a proportion of a component having a molecular weight, in terms of polystyrene by GPC of 600 or greater, of 1.5 wt % or less, and an absorbance at 300 nm by ultraviolet absorptiometry (measurement conditions: a sample concentration of 1 g/dm$^3$ and a cell length of 1 cm) of 0.3 or less.

3. The binder resin according to claim 1, leaving no residual soil after being thermally treated at from 25° C. to 500° C. at a rate of increase of 5° C. per minute under a nitrogen atmosphere.

4. A binder resin composition which comprises the thermally decomposable binder resin of claim 1 and an inorganic solid powder.

5. The binder resin composition according to claim 4, further comprising an organic solvent.

6. The binder resin composition according to claim 4, wherein the inorganic solid powder is a metal powder.

7. The binder resin composition according to claim 4, wherein the inorganic solid powder is a ceramic powder.

8. The binder resin composition according to claim 7, wherein the ceramic powder is an indium tin oxide powder.

9. The binder resin composition according to claim 4, wherein the inorganic solid powder is a glass powder.

10. A molded article comprising the binder resin composition of claim 4.

* * * * *